Jan. 19, 1943. C. T. JACOBS 2,308,657
COCKTAIL SHAKER
Filed Nov. 30, 1938 3 Sheets-Sheet 1
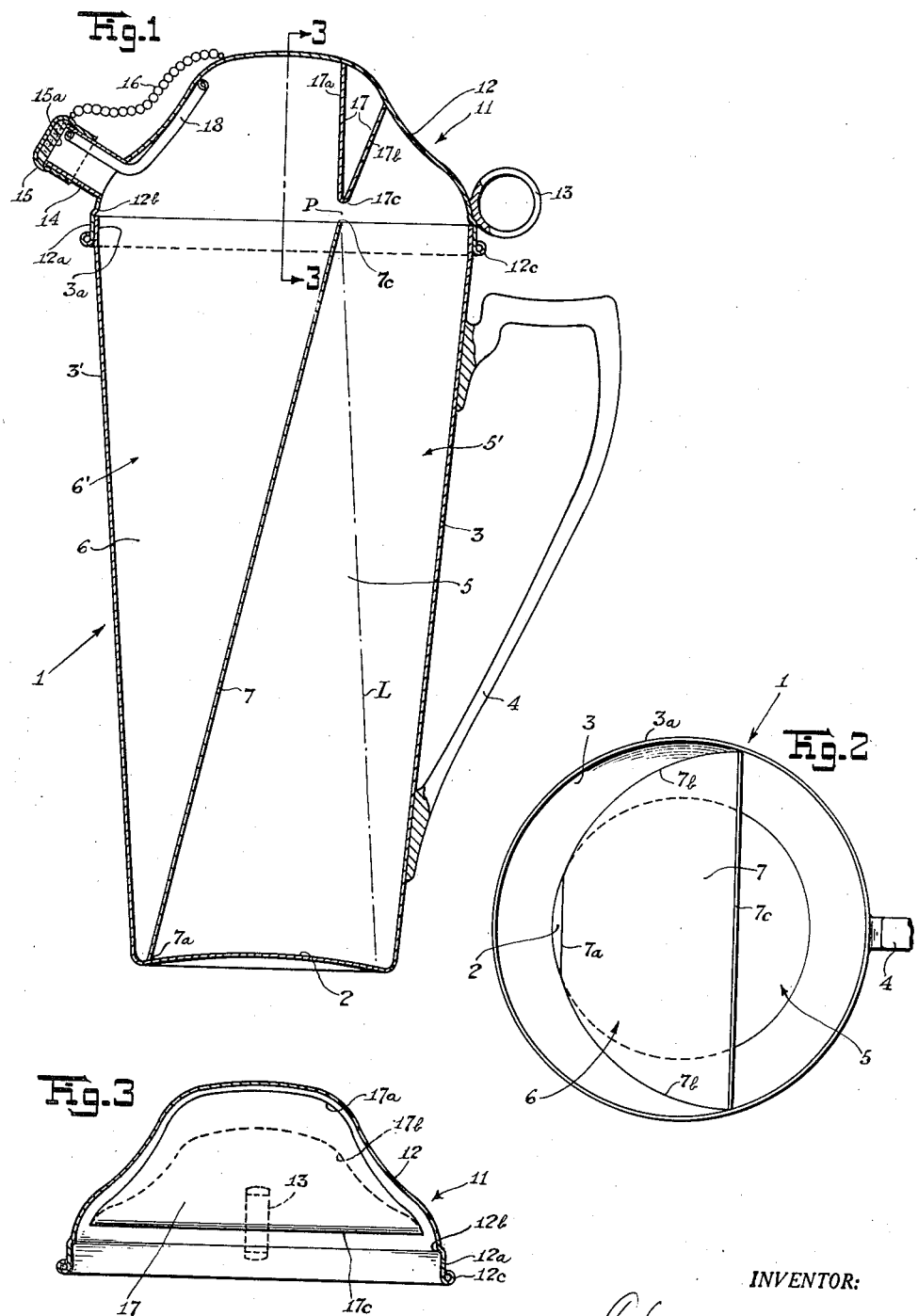
INVENTOR:
Charles T. Jacobs Jan. 19, 1943.  C. T. JACOBS  2,308,657
COCKTAIL SHAKER
Filed Nov. 30, 1938  3 Sheets-Sheet 2
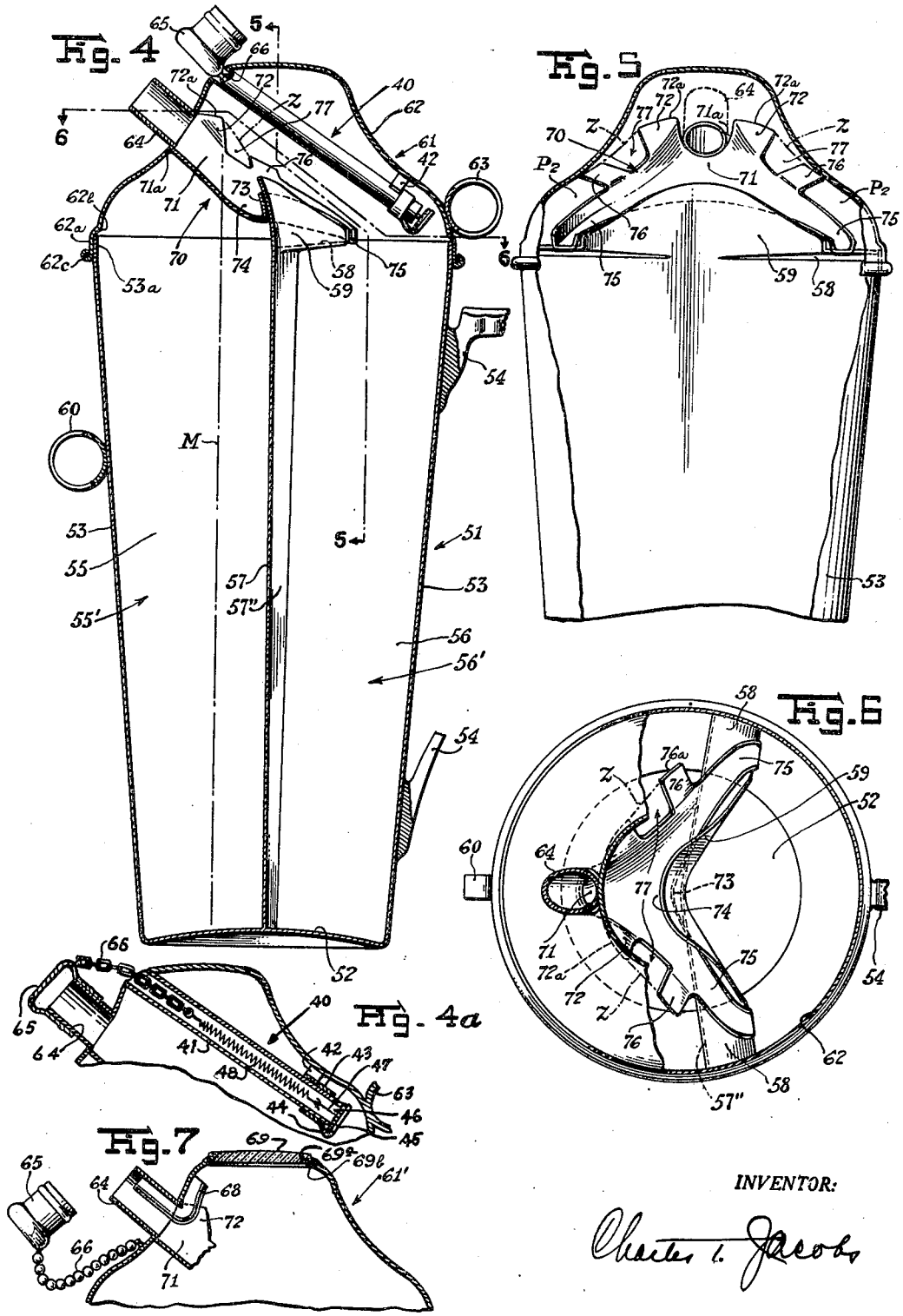
INVENTOR:
Charles T. Jacobs

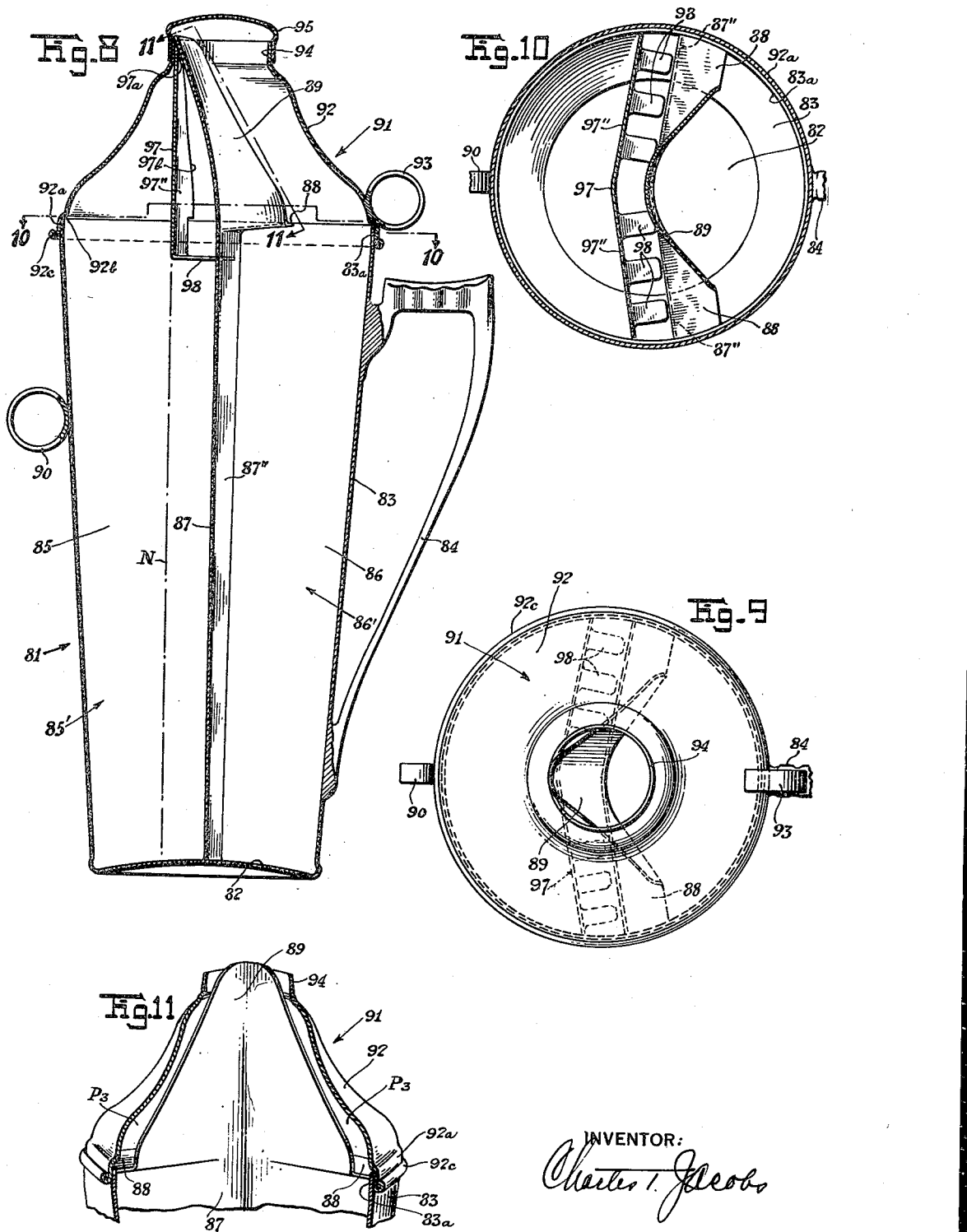

UNITED STATES PATENT OFFICE 2,308,657

COCKTAIL SHAKER

Charles T. Jacobs, New Providence Township, Union County, N. J.

Application November 30, 1938, Serial No. 243,225

18 Claims. (Cl. 220—1)

This invention relates to beverage shakers, and more particularly to those of the type commonly known as "cocktail shakers"—into which ingredients including one or more liquids may be loaded, with ice, for chilling and mixing.

It is generally desirable that the ingredients be brought into immediate contact with the ice, not only for maximum speed of chilling but, in the case of many cocktails, also for a certain slight dilution by ice melting during the mixing or initial preparation—a dilution relied on in cocktail recipes generally, and universally inherent in good bar-prepared cocktails. It is equally undesirable, however, that the dilution of the cocktails shall continue while they, or any portion of them, remain in the shaker awaiting use after initial preparation. The purchaser or user of a shaker is confronted with a dilemma: whether to have the ice always kept separate within the shaker from the ingredients, and accordingly to lose speed of chilling, desirable initial dilution, ease of loading, etc.; or to have the ice always in contact with the ingredients, and to put up with excessive and progressive dilution of cocktails not promptly poured from the shaker. Such possible temporizations as careful restriction of the quantity of ice employed, or pouring out of all the just-prepared cocktails into a separate and unchilled container, or more frequent preparations each of the precise quantity desired at the moment, are rather unsatisfactory at best, and particularly so to the host of a group whose individual appetites are probably, to say the least, difficult of accurate prediction from moment to moment. It is a broad object of my invention completely to avoid this dilemma.

It is an object of the invention to have the ice in contact with the ingredients during initial preparation of the cocktails, and thereafter held out of contact therewith. It is a more specific object to have the ice in such contact during initial preparation, and thereafter to have the ice, and the water produced by its melting, out of contact with the cocktails but in cooling relationship thereto.

It is an object to provide a shaker appropriate to these practises. It is an object to provide such a shaker which is of great simplicity. It is an object to provide a shaker with which these practises may be followed with great ease, instinctiveness and certainty. And it is an object to provide a shaker with which these practises may be followed with that degree of ease, instinctiveness and certainty which is appropriate to the frequent circumstances of use of the shaker.

It is an object to provide a shaker between parts of which the contents may be transferred in an appropriate manner.

It is an object to provide a shaker wherein liquid prematurely transferred may be readily retransferred.

It is an object to insure the absence from cocktails stored within the shaker of undissolved excess solid ingredients, such as sugar settled at the bottom of the cocktails and tending excessively to sweeten the last-poured.

It is an object to promote generally the uniformity of the cocktails from the first- to the last-poured.

It is an object to improve the smoothness of flow of the cocktails in their discharge from the shaker.

It is an object to remove the impediment occasioned by ice to the smoothness of outflow of the cocktails.

It is an object to remove the impediment occasioned by air rarefaction to the smoothness of outflow.

It is an object to provide an air intake path automatically controlled to avoid leakage during shaking.

It is an object effectively to dispose of the chain or the like employed to secure the outlet closure member against loss.

It is an object to provide simple and effective constructions and arrangements for the base unit of the shaker; for the cover unit of the shaker; and for the entire shaker.

And it is a broad object to provide a generally improved cocktail shaker.

Other and allied objects will more fully appear from the following description and the appended claims.

In the description reference is had to the accompanying drawings, wherein

Figure 1 is a vertical cross-sectional view taken substantially through the axis of an assembled shaker according to one embodiment of the invention;

Figure 2 is a top plan view of the base unit of the shaker of Figure 1;

Figure 3 is a vertical cross-sectional view taken through the cover unit of the shaker of Figure 1 substantially along the line 3—3 of that figure;

Figure 4 is a vertical cross-sectional view taken substantially through the axis of an assembled shaker according to still another embodiment of the invention;

Figure 4a is a cross-sectional view of the air-intake arrangement otherwise illustrated in Figure 4;

Figure 5 is a vertical cross-sectional view of the assembled shaker of Figure 4, taken substantially along the line 5—5 of that figure;

Figure 6 is a horizontal cross-sectional view of the assembled shaker of Figure 4, taken substantially along the line 6—6 of that figure;

Figure 7 is a partial vertical cross-sectional view of an alternative cover unit for the shaker of Figure 4;

Figure 8 is a vertical cross-sectional view taken substantially through the axis of an assembled shaker according to still a further embodiment of the invention;

Figure 9 is a top plan view of the assembled shaker of Figure 8, the top cap being removed;

Figure 10 is a horizontal cross-sectional view of the assembled shaker of Figure 8, taken substantially along the line 10—10 of that figure; and Figure 11 is an inclined cross-sectional view of the assembled shaker of Figure 8, taken substantially along the line 11—11 of that figure.

Figures 1 through 3 illustrate a very simple embodiment of my invention. Herein the shaker will be seen to consist generally of a base unit 1 and a top unit 11, each typically of brass or other metal. Exteriorly the base unit may be of a usual form, having the closed bottom 2 and the inverted-truncated-conical side wall 3 terminating at its top in the narrow, approximately cylindrical rim portion 3a; it may be provided with a handle 4 of approximately question-mark form, disposed in a vertical plane which passes through the axis of the base unit, and terminally secured to the side wall 3. Interiorly the base unit comprises two receptacles 5 and 6. These may be most simply formed by the side wall 3 and a transverse wall 7 suitably secured to the side wall and bottom, though it will be understood that any manner of formation of the compartments which provides them in equivalent form and mutual arrangement is within the scope of the invention. The transverse wall 7 may be disposed in a plane at right angles to the plane of the handle 4; its bottom edge 7a may be secured to the bottom 2 of the base unit very close to the front of the latter, and therefrom it may extend diagonally rearwardly (i. e., toward the handle) and upwardly to terminate in a top edge 7c forming a chord cutting across the rim portion 3a somewhat to the rear of the center of the latter. Not only is the bottom edge 7a secured to the base unit bottom 2, but also the side edges 7b of the wall portion 7 are secured to the side wall 3; the securing of these edges, which will be understood to be liquid-tight, may be by soldering, welding, or in any other convenient manner whatsoever. By virtue of the described proportioning and arrangement, the receptacle 5, lying behind the tranverse wall 7, is of a capacity somewhat greater (for example to the order of some 20 to 30 per cent) than that of the forward receptacle 6.

The cover unit 11 may comprise an inverted cup-shaped cover 12 terminating at its bottom in an outwardly and upwardly rolled edge 12c; having the narrow, approximately cylindrical rim portion 12a immediately above the edge 12c; and having a slight inwardly formed shoulder 12b immediately above the rim portion 12a. It will be understood that the rim portion 12a is adapted to fit tightly over and frictionally engage the rim portion 3a of base unit 1 in conventional manner. For convenience in removal of the cover unit from the base unit the former may be provided with a ring-shaped finger-piece 13 secured to the cover 12 just above the shoulder 12b and extending outwardly in a vertical plane which passes through the cover axis; a normal angular relationship of the cover unit to the base unit will be one wherein the planes of the handle 4 and the finger-piece or ring 13 approximately coincide. From the front of the cover unit (i. e., opposite the ring 13) just above the rim portion 12a there may extend diagonally forwardly and upwardly a short outlet tube 14 fully communicating with the interior of the cover unit and secured in a suitable aperture in the cover 12 in any convenient manner. For the outer end of the outlet tube 14 there may be provided any well-known form of cap 15, if desired having a cork or other insert 15a and being connected by a chain 16 to the cover unit for protection against loss.

In the cover unit 11, for example in one or more planes at right angles to the plane of ring 13, may be secured a baffle 17; when the cover unit is assembled in normal relationship to the base unit the lower edge 17c of this baffle is parallel to and narrowly spaced from the top edge 7c of the base unit wall 7. The baffle 17 may be in the form of a sheet having an edge 17a fitting and fully secured to the inside of the cover 12 and extending downwardly therefrom in a vertical plane to the edge 17c, along which the sheet is folded rearwardly and upwardly to terminate in an edge 17b also fitting and fully secured to the inside of the cover 12 (the space enclosed within the fold of the baffle 17 thus being completely sealed).

The cover unit 11 may be considered as enclosing the pair of receptacles 5 and 6 of the base unit, and extending them into respective compartments 5' and 6' of the assembled shaker—while providing a path or passage between the compartments in the form of the aperture P formed between the edges 7c and 17c.

The use of the shaker of course begins with the cover unit removed from the base unit. Ice and ingredients are loaded into the rear, relatively larger receptacle 5; and the cover unit is assembled to the base unit in at least approximately its normal relationship thereto, and with the cap 15 frictionally or otherwise engaged on tube 14. The entire shaker may now be shaken to chill and mix the ingredients. If this shaking is carried on with the shaker in an average position of rearward inclination very roughly of the order required to bring wall 7 horizontal, the ingredients will pass through aperture P into compartment 6' to only small extent during the shaking. If any axially directed shaking is carried on with the shaker in some other average position, the ingredients will pass into compartment 6' somewhat more easily and rapidly; but in any case there may be made from time to time during the shaking a momentary pause with the shaker in slightly more rearward inclination than brings wall 7 horizontal, during each of which pauses any liquids in compartment 6' will re-transfer into compartment 5' by running along wall 7 and baffle 17 to aperture P and through the latter. This re-transfer into compartment 5' of liquids leaving it prematurely (i. e., during shaking) is important only insofar as required to insure thoroughness in initial chilling and in the mixing of difficult-to-mix ingredients, in many instances it is of scant importance. And in any event a suitable shaking technique is attained by the average user in almost no time at all, following a moment's thought on the matter during his initial use of the shaker.

At the conclusion of the desired shaking the shaker is restored from its rearward inclination, and oriented or inclined forwardly, a trifle more than sufficiently to bring wall 7 horizontal. All the liquid contents in compartment 5' will now flow along wall 7 and baffle 17 to aperture P and transfer through the latter into compartment 6'—ice, however, being retained in compartment 5' in view of the restricted dimension of aperture P in the normally vertical direction. Experience readily determines a point along the lower portion of the handle 4 whereat the shaker may be hung from one or two fingers to result in the contents automatically rocking the shaker into the proper forward orientation for a complete liquid transfer; and completeness of this transfer may moreover be utterly assured by a slight slow rocking of the shaker, after the readily detected stoppage of substantial liquid movement therewithin, back and forth through a small range of forward orientations around that above-mentioned. Upon return of the shaker to normal vertical position all the chilled and mixed ingredients, or then-prepared cocktails, will be in receptacle 6 (i. e., compartment 6'), while then-unmelted ice will be in receptacle 5 (i. e., compartment 5'). Although the ice is thus held out of contact with the cocktails, it will be appreciated that it and the ice-water (i. e., mixed ice and water, and ultimately wholly water) which it produces remain in close cooling association with the cocktails (being thermally coupled thereto for example directly through wall 7, as well as a little less directly, but effectively, through side wall 3 and bottom 2).

It will be convenient to term the compartment 5' as a first or mixing compartment, and the compartment 6' as a second or storing compartment; correspondingly, the receptacle 5 may be termed the mixing receptacle and the receptacle 6 the storing receptacle.

The function of the tube 14 is to provide an outlet for liquid from the storing compartment 6' through which essentially the entire contents of that compartment may be progressively discharged from the shaker by a progressive forward pouring orientation of the shaker. It may be noted that it joins or leads away from the compartment 6' very nearly at the top of that compartment—which is desirable in arranging for proper pouring without entailing long outlet tubes or the like. Preferably it is positioned opposite the handle 4 and otherwise so as to limit the maximum required in the range of pouring orientations to an orientation which brings substantially horizontal the forward surface 3' of the side wall 3 (it being understood that the illustrated positioning of the tube in the cover unit is only illustrative of one such positioning, and is not intended as limitative). The cap 15 being removed from the tube after the transfer manipulation above described, a progressive forward or pouring orientation of the shaker will cause the desired progressive discharge of cocktails through the tube, the discharge of course being interrupted whenever desired by restoration of the shaker to normal vertical position. During the pouring orientation ice-water in compartment 5' will advance on the wall 7 toward the aperture P. In view, however, of the inclination of the wall 7 to the forward side wall surface 3', the wall 7 will prevent ice-water contents of compartment 5', up to the order of half the capacity of the receptacle 5, from reaching the aperture P; by way of illustration, when 3' is brought horizontal to complete the pouring orientation, ice-water could be present in the entire space bounded by wall 7, bottom 2 and the plane-representing line L in Figure 1 (which space is of the order of half the capacity of receptacle 5), without passing out of the compartment 5'. Actually the ice-water will represent only a minor fractional-capacity content in the receptacle 5—under ordinary circumstances of use being of much less than ⅓, and usually at most of the order of ¼, of the capacity of that receptacle. Accordingly the wall 7 retains the ice-water in compartment 5' throughout the pouring orientation, preventing it from being discharged from the shaker and from mixing within the shaker with the cocktails in compartment 6'.

A feature of the shaker of Figures 1 through 3 is that the lowest line of liquid flow through the passage between the compartments (e. g., through the aperture P) extends, at any time during the normal repose of the shaker or during its pouring orientation, not only above the level then reached by the cocktails in the storing compartment but also above the level then reached by the ice-water in the mixing compartment—so avoiding the undesired intermixing of the contents of these compartments.

Not only is the ice-water rendered ineffective to dilute the cocktails, but also the pouring of the cocktails out of the tube 14 is freed of any impediment by collection of ice against its inner extremity. To render the pouring utterly smooth, and immediately and perfectly responsive to the shaker orientation, it is desirable that there be avoided during pouring any rarefaction of air within the shaker—which would have to be relieved by intermittent quantities of air passing inwardly through tube 14, in opposition to the outward flow of cocktails and in disturbance of the smoothness of that flow. An air intake to avoid this rarefaction, but automatically closed (to avoid possible leakage during shaking and/or transfer) whenever the tube 14 is closed by the cap 15, has been shown in the form of an open-ended small-diameter tube 18 extending inwardly within the tube 14 from adjacent the outer extremity of the latter, and curving upwardly to terminate within the top part of the cover unit 11 where it will not be reached by liquid during pouring orientations.

It will be understood that an aspect of my invention is the pouring of essentially all the cocktails from the storing compartment by an orientation which is different from the orientation for transfer from the mixing compartment into the storing compartment and which, because different, can avoid unwanted inter-compartment transfer of contents during the pouring. This aspect characterizes the shaker of Figures 1 through 3 in that the pouring orientation differs from the transfer orientation in degree, measured approximately by the substantial angle between wall 7 and the forward side wall surface 3'. By alternative arrangement of the shaker, however, the difference between pouring and transfer orientations may be rendered a difference in direction, as well as or instead of a difference of degree. One broad alternative arrangement renders the pouring and transfer orientations substantially the opposites of each other; and this broad alternative arrangement is embodied in each of the two shakers shown in the drawings following the illustration of the shaker already described—in specifically different form in each of these two shakers. These two shakers have in common, among other things, a reversal of the arrangement of compartments shown in Figures 1 through 3—i. e., the mixing compartment is made the forward one and the storing compartment the rearward one. While certain broad aspects of the invention are not necessarily limited thereto, there is characteristic of each of these two shakers the feature of the extending of the lowest line of liquid flow through the inter-compartment passage above the levels, both normally and during pouring orientation, of both the cocktails and the ice-water in the respective compartments, and the feature of leading the pouring outlet from near the top of the storing compartment—each of which features has already been mentioned in connection with the shaker of Figures 1 through 3.

In Figures 4 through 6 I show a shaker embodying my invention with the respective compartments in the relative disposition last described, with the outward passage of cocktails from the storing compartment taking place around, and more specifically over, the mixing receptacle. In these figures the shaker will be seen to consist of a base unit 51 and a cover unit 61. The base unit may comprise the closed bottom 52 and the inverted-truncated-conical side wall 53 terminating at its top in the narrow approximately cylindrical rim portion 53a; it may be provided at its rear with a handle 54 generally similar to the handle 4 of Figure 1 and fractionally appearing in Figure 4. Interiorly the base unit 51 comprises the forward or mixing receptacle 55 and the rearward or storing receptacle 56; these may be simply formed by the side wall 53 and a vertical transverse wall 57 joined to the side wall and bottom. The transverse wall 57 may be slightly trough-shaped, being for example in the form of two plane portions 57" meeting at a slightly rounded angle of the order of 160 degrees along the axis of the base unit, the angle pointing forwardly to render the rearward or storing receptacle the smaller. A substantial flange 58 is formed rearwardly from the top of the wall 57, the flange being joined to the side wall rim portion 53a at its extremities. Through the central portion of the flange 58 the contour of its rear edge may be in the form of a wide V, of the order of 100 to 110 degree angle for example, and of slightly rounded and forwardly directed apex at which the flange width becomes zero. From the edge of the V there is formed upwardly a pouring lip or guide 59, which in the apical region will be understood to constitute a smooth extension of the apical region of the wall 57; the lip 59 may be of small height at the extremities of the V, of progressively greater height toward the apex, and somewhat forwardly curved in its higher portions.

The shaker of Figures 4 through 6 has a cover unit 61 which may comprise an inverted cup-shaped cover 62 terminating at its bottom in an outwardly and upwardly rolled edge 62c; having the narrow, approximately cylindrical rim portion 62a immediately above the edge 62c; and having a slight inwardly formed shoulder 62b immediately above the rim portion 62a. It will be understood that the rim portion 62a is adapted to fit tightly over and frictionally engage the rim portion 53a of base unit 51 in conventional manner. For convenience in removal of the cover unit from the base unit the former may be provided with a ring-shaped finger-piece 63 secured to the cover 62 just above the shoulder 62b and extending outwardly in a vertical plane which passes through the cover axis; a normal angular relationship of the cover unit to the base unit will be one wherein the planes of the handle 54 and the finger-piece or ring 63 approximately coincide, the point of securing of the latter being accordingly the rear of the cover unit.

At the front of the cover unit 61, for example approximately mid-way between the rim portion 62a and the center of the unit, there may be provided a short outlet tube 64; this leads diagonally forwardly and upwardly from the cover, fully communicates with the interior of the cover unit, and is secured in a suitable aperture in the cover in any convenient manner. A removable cap 65, of any well-known variety, is provided for the outer end of the tube 64; the cap may be secured to the end of a chain 66. In connection with this chain there may be provided an air intake unit 40; this intake unit may be positioned in the cover unit in any convenient manner, for example leading diagonally downwardly from a little above the tube 64.

The air intake 40 is illustrated not only in Figure 4, but also in more detail in Figure 4a. Broadly like the air intake of Figure 1, it is separated from the liquid outlet, is closed against leakage when that outlet is closed, and is automatically opened in response to the opening of that outlet. The air intake 40 is, however, of a specifically different form; and is arranged to perform the additional function of automatically storing within the shaker the chain 66 which may be employed to secure the cap 65 against loss, and which would otherwise dangle loosely, with the cap, during pouring. It comprises an open-ended tube 41, having its outer end fitted and secured in a suitable aperture in the cover, and extending inwardly therefrom for example for a major fraction of the cover diameter; its inner end portion may be reinforced by a bracket 42 extending downwardly thereto from the cover. Over the inner end of tube 41, and for example up to the bracket 42, there may be slipped a spring clip 43, from which a narrow leaf spring 44 is curved first upwardly and then downwardly to terminate in a disc 45 opposite the inner end of tube 41. To the surface of the disc 45 is secured a cork or other gasket 46; and spring 44 is biased so that in the absence of other forces it maintains gasket 46 slightly spaced from the inner end of tube 41 (as seen in Figure 4), so that air may then pass inwardly into the shaker through that tube. Centrally secured to the disc 45 and extending through gasket 46 is a small hook 47; to this hook is secured one end of a tension spring 48 housed within tube 41; and to the other end of spring 48 is secured the cap-chain 66. The lengths of chain and spring 48 and the forces of springs 48 and 44 are so apportioned that when the cap is in place over the outlet tube 65 the spring 48 is expanded and the gasket 46 held tightly against tube 41 to seal the latter, and that when the cap is removed spring 48 contracts to retract all or substantially all of chain 66 into tube 41 and to permit spring 44 to space gasket 46 away from the tube end and so to open the air intake; Figures 4a and 4 illustrate these respective conditions. Obviously a valve controlling the air intake is formed by the gasket and its moving means.

In the shaker of Figures 4 through 6 the conveyance of cocktails from the pouring lip 59 over the mixing receptacle 55 to the outlet tube 64 is performed by a bridge or "aqueduct" 70—it being understood that the term "aqueduct" is intended to imply a means for the conveyance of liquid and not specifically of water. In general, cocktails are discharged from the lip 59 into the aqueduct 70 and are thereby guided to the outlet tube 64. It is desirable that any cocktails discharged into the aqueduct, and not yet discharged out of the tube 64 at the moment of interruption of a pouring orientation, should be returned into the storing compartment 56; for this reason the aqueduct is preferably made in the form of a Y-shaped member, the branches of the Y being adapted to embrace the V-shaped lip 59. It may also be noted that the aqueduct may be made to form a baffle for the retention of ice in the mixing compartment during transfer, and of ice-water in the mixing compartment during pouring, and that in a general sense the aqueduct delimits the mixing and storing compartments 55′ and 56′ within the cover unit 61. With these general observations in mind, attention may be given to the formation and details of the particularly disclosed aqueduct.

The aqueduct 70 has the forward trough-shaped portion 71 forming the central leg of the Y, terminally joined to the interior of the cover 62 (immediately underneath and at the sides of the inner extremity of the outlet tube 64) along its edge 71a, and extending diagonally downwardly and rearwardly from that edge with progressively increasing width. Beginning at its forward extremity, this portion of the aqueduct is provided with the outwardly folded and approximately triangular ears 72, joined to the cover 62 along their forward edges 72a (which are continuous with the forward edge 71a abovementioned). At its rear the forward aqueduct portion 71 terminates in an upwardly and somewhat forwardly directed flange 73 which is positioned, when the cover unit is assembled to the base unit, in very slight spaced relation to the pouring lip 59 and with its top edge somewhat below the central portion of the top edge of that lip. From its central region 74 just in front of the flange 73 the aqueduct 70 divides into the branches 75, each trough-shaped, respectively extending on the two sides of the pouring lip 59 to overhang the rear edge of the flange 58, and each slanting progressively downwardly (but preferably at an inclination less than that of aqueduct portion 71) toward its extremity—the outer sides of the portion 71 and the flange 73 of course merging into the sides of the branches 75. From the outer side of each branch 75 there may be outwardly folded (for example about at the axial plane at right angles to the plane of the handle 54) the respective ears 76, each of these being joined along its outer edge 76a to the interior of the cover 62. It may be noted that a respective relatively small aperture 77 is formed between each branch 75, the respective ears 76 and 72, and the cover 62 (the shortest line between these two ears along the interior surface of the cover having been approximately shown in the figures as the dash-dot line Z). The apertures 77 constitute portions of the passage between the compartments 55′ and 56′; other portions of this passage are designated as P₂ in Figure 5 wherein they are best seen, between the end portions of the branches 75 and the cover 62 and flange 58 (and still another small portion of the passage lies between the lip 59 on the one hand and branches 75 and flange 73 on the other).

In the use of the shaker of Figures 4 through 6, ice and ingredients are loaded into the forward or mixing receptacle 55, and the cover unit is assembled in the illustrated relationship to the base unit and the cap 65 is placed over the outlet tube 64. The entire shaker may now be shaken to chill and mix the ingredients. Preferably the shaking is carried on with the shaker forwardly oriented to approximately a horizontal position with outlet tube 64 downwardly directed, thereby minimizing premature transfer of liquid into the compartment 56′; but in any event prematurely transferred liquid (disregarding an unimportantly small quantity which may become trapped in and immediately adjacent to the outlet tube 64) may re-transfer into compartment 55′ through the apertures 77 whenever the shaker is momentarily held in approximately the mentioned horizontal position.

At the conclusion of the desired shaking the shaker is restored from its forward orientation, and oriented rearwardly to approximately the horizontal. This rearward orientation may be effected with extreme simplicity by hanging the shaker on a finger placed through a ring 60 which is shown secured, in a vertical axis-containing plane, to the outside of the side wall 53 at the front of the shaker and at a spacing from the bottom 52 appropriate to balance of the shaker in the horizontal orientation. All the liquid contents of the compartment 55 will now flow along the wall 57 and over the now-nearly-vertical flange 58 into the storing compartment 56′, principally through the inter-compartment passage portions P₂; ice will of course be retained in the compartment 55′ by reason of the small size of all the passage portions, the aqueduct 70 thus acting as an ice baffle. The slight "troughing" of the transverse wall 57 will not preclude the completeness of the transfer into compartment 56′, which may be utterly assured by a final slight rocking of the shaker (still for example suspended from the ring 60) about the horizontal; and upon restoration of the shaker to normal vertical position all the chilled cocktails will be in the receptacle 56. Upon this restoration the cap 65 will be removed from the outlet tube 64, thereby automatically opening the air intake 40.

In a progressive forward orientation of the shaker after transfer, the cocktails will reach the tip of the pouring lip 59 before they can reach any portion of the inter-compartment passage; this is insured, even for full-capacity contents of the receptacle 56, by a sufficient width of flange 58, on which the cocktails then advance. Beginning with that orientation where they reach the lip tip, the cocktails will be progressively discharged over the lip into the central aqueduct region 74; and with that orientation, the bottom of the forward aqueduct portion 71 will have been forwardly oriented at least substantially to, if not beyond, the horizontal (while the branches 75 will have been oriented upwardly past the horizontal). Accordingly the cocktails discharged into the aqueduct will flow through its forward portion 71 to the outlet tube 64 and pass outwardly through the latter, the depth of the aqueduct and the diameter of the outlet tube being sufficient to carry off the cocktails at a rapid rate without loss through the apertures 77. Upon interruption of the pouring, particularly if the interruption be rapid, some small quantity of cocktails may be kept from passing out of the aqueduct through tube 64; but this quantity runs down the branches 75 and thus back into the storing compartment. Pouring orientation is obviously complete when the shaker has been forwardly oriented to horizontal, the "troughing" of the transverse wall 57 providing an ample tolerance to deviations from vertical of the plane of handle 54 during pouring.

During the pouring orientation ice-water in compartment 55' will advance on the forward portion of side wall 53, later on the forward portion of the cover 62, and finally on the forward portion of the aqueduct 70; but unless ice-water reaches the apertures 77, it is precluded from passing into the compartment 56' or in any way reaching the outlet tube 64. Thus the mentioned elements on which it advances, and in particular the aqueduct 70, cause the retention of the ice-water in compartment 55', and they do so for an ice-water content of the more-than-ample value of half or more of the capacity of the receptacle 55; by way of illustration, when the shaker is brought to horizontal to complete the pouring orientation, ice-water could be present in the entire space bounded by the forward portions of side wall 53 and of top 62 and of the aqueduct 70 and by the plane-representing line M in Figure 4, without passing out of the compartment 55'. As in the case of all the other shakers herein disclosed, the retention of the ice-water in the mixing compartment of course serves to keep cool the cocktails in the storing compartment, principally by conduction through the transverse and side walls.

While I have illustrated and described the shaker of Figures 4 through 6 as including an air intake of the type illustrated as 40, it will be understood that the presence of the liquid outlet 64 in the cover renders it possible alternatively to employ an air intake of the relatively simpler type disclosed in connection with Figure 1. Accordingly in Figure 7 I have re-illustrated as 61' a fractional top portion of the cover unit 61, modified in that the air intake 40 is omitted and replaced by an open-ended small diameter tube 68 extending inwardly through the outlet tube 64 from adjacent the outer extremity of the latter, and curving upwardly to terminate within the cover unit 61' above the outlet tube 64 where it will not be reached by liquid during pouring orientation. In Figure 7 the chain 66 for cap 65 will appropriately be secured directly to the exterior of the cover unit 61'.

The cover unit 61' is also optionally modified in that its central top portion is provided with a circular aperture 69a, and extending slightly inwardly from the periphery of this aperture at its bottom may be provided the annular shoulder 69b. A circular window 69 of transparent material may be secured in any convenient and preferably liquid-tight manner within the aperture 69a and in abutment against the shoulder 69b; by way of example, the window 69 may be one of the common so-called "unbreakable watch crystals" snapped into place in the aperture 69a. It will be understood that the aqueduct 70, baffling the ice at all times away from the top of the shaker, permits such a window without danger of its damage or dislodgement during shaking. The window provides not only an interesting novelty, but also the opportunity to observe the pouring of the cocktails from the lip 59 into the aqueduct 70 and their travel in the latter.

While somewhat complicated in respect of required description, the shaker as shown in Figures 4 through 6, either as illustrated therein or as modified in accordance with one or more of the features of Figure 7, is actually one which may be very simply formed and which is highly satisfactory in use.

In Figures 8 through 11 I illustrate a shaker having much in common with that of Figures 4 through 6, including the feature of outward passage of the cocktails from the storing compartment taking place over the mixing receptacle; the shaker of Figures 8 through 11 is specifically different, among other things, in that the aqueduct or member which carries the cocktails above the mixing receptacle is formed from and constitutes a part of the base unit 81. This base unit may be most simply described as including the bottom 82, side wall 83 (with rim portion 83a), handle 84, transfer ring 80, transverse wall 87 (with relatively angled portions 87'', and defining the forward or mixing receptacle 85 and the rearward or storing receptacle 86), and flange 88, all of which may be quite similar in themselves and in their mutual relationships to the respective elements 52, 53, 54, 60, 57 and 58 of the shaker of Figures 4 through 6. The cover unit 91 may be described as comprising the cover 92 including the edge 92c, rim portion 92a, shoulder 92b and ring 93 (like portions 62c, 62a and 62b and ring 63 of cover unit 61 of the previous shaker), but formed at its top into an open short cylindrical flange 94, of diameter for example of the order of a quarter to a third of the maximum cover unit diameter. The open flange 94 provides at once a space through which cocktails may be discharged (in manner hereinafter apparent) and through which air may enter the shaker, during pouring; it may be closed during shaking and transfer by an inverted cup-shaped cap 95 which may be slipped thereover and frictionally engaged thereon.

From the V-shaped central portion of the rear edge of flange 88 a pouring guide 89, horizontally of rounded-V cross-section, is upwardly formed, constituting in its apical region a smooth extension of the apical region of the wall 87; this much is in analogy to the guide 59 of the preceding figures. But the guide 89 is upwardly extended, in progressively reducing horizontal dimensions and with a progressively forward inclination, so that its top extremity or tip slightly overhangs (when the cover unit is assembled to the base unit) the most forward region of the cylindrical flange 94. In a general sense the guide 89 delimits the mixing and storing compartments 85' and 86' within the cover unit; and as may be best seen in the cross-sectional Figure 11, a narrow inter-compartment passage P₃ on each side of the guide 89 is bounded by the side edge of the guide, the inside surface of the cover 92, and the flange 88. An element not yet described is illustrated as secured in the cover unit 91; but as the shaker may be operated without it, the operation may be first reviewed without reference to it.

Ice and ingredients are loaded into the mixing receptacle 85, the cover unit is assembled to the base unit, and the cap 95 is placed over the flange 94. Shaking to chill and mix the ingredients is preferably carried on with the shaker forwardly oriented to approximately a horizontal position with handle 84 upwardly directed, thereby minimizing premature transfer of liquid into compartment 86'; but in any event prematurely transferred liquid may re-transfer, by flowing on guide 89 to the cap 95 and therefrom through passage $P_3$ into compartment 85', whenever the shaker is momentarily held approximately in the mentioned horizontal position. At the conclusion of desired shaking the shaker is restored from its forward orientation and oriented, for example with the aid of the transfer ring 90, rearwardly to approximately the horizontal. Quite analogously to the action occurring in the use of the preceding shaker, all the liquid contents of compartment 85' will transfer into compartment 86'; the passage $P_3$ is too narrow to pass ice. Upon restoration of the shaker to normal vertical position all the chilled cocktails will be in the receptacle 86; thereupon the cap 95 will be removed from the flange 94.

In a progressive forward orientation of the shaker after transfer, the cocktails will reach the tip of the guide 89 before they can reach any portion of the inter-compartment passage; this is insured, even for full-capacity contents of the receptacle 86, by a sufficient width of flange 88, on which the cocktails then advance. Beginning with that orientation where they reach the guide tip, the cocktails will be progressively discharged thereover and so out of the shaker. Pouring orientation is obviously complete when the shaker has been forwardly oriented to the horizontal, a tolerance to deviations from vertical of the plane of the handle 84 during pouring being provided as in the previous shaker.

During the pouring orientation ice-water in compartment 85' will advance on the forward portion of side wall 83 and later on the forward portion of the cover 92; but unless it reaches the opening provided by the flange 94 it is retained in the compartment 85' by the elements on which it advances. These are capable of retaining an ice-water content of the more-than-ample value of half or more of the capacity of receptacle 85; by way of illustration, when the shaker is brought to horizontal to complete the pouring orientation, ice-water could be present in the entire space bounded by the forward portions of side wall 83 and of cover 92 and by the plane-representing line N in Figure 8, without passing out of the compartment 85'.

It may be noted that while the element on which ice-water may finally advance during pouring out of the shaker of Figures 4 through 6 (i. e., the forward portion of the aqueduct 70) is disposed at a sharp reverse angle to the path of the ice-water advancing thereon, the final portion of the cover 92 leading to the flange 94 in the shaker of Figures 8 through 11 is characterized by no such angle, but leads rather smoothly to the flange. Accordingly with the latter shaker as so far described, it is possible that with inapt handling, and resulting undue momentum of ice-water or the like, a little ice-water might escape over the flange 94 into the glass intendedly receiving cocktails from guide 89. Positively to preclude any such misfortune I prefer to secure a baffle 97 in the cover unit 91; typically this baffle may be slightly trough-shaped, in the form for example of two normally vertical planes 97" meeting at a slightly rounded and forwardly directed apex or angle of the order of that of wall 87. The central top portion 97a of the baffle 97 may extend upwardly within the flange 94 and be fitted and joined against the forward interior surface of the flange; and the sides 97b of the baffle may be fitted and joined to the interior surface of the cover 92, to result in a continuous juncture of baffle with cover from an intermediate or low point on one side of the cover up, over and down to a similar point on the other side. Such a baffle, being disposed at an especially sharp reverse angle to the path of ice-water advancing thereon, invests the shaker of Figures 8 through 11 with positive assurance of retention of ice-water in the compartment 85' in spite of possible grossly inapt handling.

It may be noted that liquid in compartment 85' will not be trapped in the angle then above the baffle during transfer into compartment 86', for although the apical region of the baffle is then horizontally disposed, the then-lowest lines along the baffle are its edges 97b, which then slope appreciably toward the transfer passage. Nor does the baffle 97 interfere, during shaking, with re-transfer into compartment 85' of liquid prematurely transferred therefrom, for its apical region is then approximately horizontal and can carry into the main portion of compartment 85' substantially all liquid reflected by cap 95 from the guide 89.

The baffle 97 being employed, it is desirable that the cover unit 91 be always assembled to the base unit 81 in the proper angular relationship to have the baffle in front of guide 89 and the baffle angle forwardly directed. A means for enforcing the assembling in such relationship may be simply provided by extending the baffle downwardly, as illustrated, to some point opposite the transverse wall 87; and there folding rearwardly from the baffle, to come substantially into contact with the wall 87, two or more lugs 98. If desired, several of these lugs may be employed to render baffle 97 fully effective as an ice baffle during shaking and transfer; this may be particularly desirable to shield the guide 89 from ice if the guide be made of fragile material or be otherwise unrugged.

It will be observed in connection with this, as well as the earlier embodiments, that the inter-compartment liquid-transfer passage during pouring orientation is in a relationship to the ice-water in the mixing compartment, and to the contents of the storing compartment, which is in each case ineffective to transfer liquid from that compartment; that upon a substantially different shaker orientation, earlier employed for transfer, the passage is in effective relationship to the mixing compartment contents; and that upon a manipulation of the shaker comprising orientation essentially opposite to the transfer orientation still earlier employable during shaking, it is in effective relationship to substantially all contents of the storing compartment, for substantially complete re-transfer of prematurely transferred liquid.

It will be understood that observations as to use and general features made at length in connection with the earlier embodiments will be understood to be contemplated in connection with all embodiments, excepting as they may be obviously or specifically inappropriate thereto. And it will be understood that while the several embodiments represent different groupings of certain features, this is primarily intended as illustrative and no particular limitations as to those groupings are intended except as specifically expressed in certain instances, since they may obviously be varied.

While disclosed primarily in connection with the primary purpose of cocktail preparation, the shaker according to my invention may have other uses which are not, unless specifically, disclaimed.

In many of the claims hereunto appended I undertake to state the scope of my invention broadly, subject however to such proper limitations as the state of the art may impose.

I claim:

1. A beverage shaker having a first compartment in which liquid ingredients may be brought in contact with ice and having a storing compartment each of which is substantially symmetrically disposed about a vertical plane passing centrally from front to rear of the shaker, provided with a liquid-transfer passage between the compartments through which the beverage may be transferred out of the first compartment while ice is retained to melt therein, and provided with an outlet leading from the vicinity of the top of the storing compartment through which essentially all the contents thereof may be discharged from the shaker by a progressive forward pouring orientation of the shaker, said liquid-transfer passage being positioned in ineffective relationship to both the ice-water in the first compartment and the contents of the storing compartment during said pouring orientation.

2. A beverage shaker having a first compartment in which liquid ingredients may be brought in contact with ice and having a storing compartment each of which is substantially symmetrically disposed about a vertical plane passing centrally from front to rear of the shaker, provided with a liquid-transfer passage between the compartments through which by a transfer orientation of the shaker in said plane the beverage may be transferred out of the first compartment while ice is retained to melt therein, and provided with an outlet leading from the vicinity of the top of the storing compartment through which essentially all the contents thereof may be discharged from the shaker by a progressive forward pouring orientation of the shaker, said liquid-transfer passage being positioned in ineffective relationship to both the ice-water in the first compartment and the contents of the storing compartment during said pouring orientation but in effective relationship to substantially all contents of the storing compartment upon a manipulation of the shaker comprising orientation essentially opposite to said transfer orientation.

3. A beverage shaker having a first compartment in which liquid ingredients may be brought in contact with ice and having a storing compartment each of which is substantially symmetrically disposed about a vertical plane passing centrally from front to rear of the shaker, provided with a permanently open liquid-transfer passage between the compartments through which by a transfer orientation of the shaker the beverage may be transferred out of the first compartment while ice is retained to melt therein, provided with an outlet from the storing compartment through which essentially all the contents thereof may be discharged from the shaker by a progressive forward pouring orientation of the shaker, and including means, advanced on by the liquid in at least one of said compartments during said pouring orientations to and including a substantially horizontal one, for preventing the co-mingling of the ice-water and the beverage.

4. A beverage shaker comprising a pair of receptacles each of which is substantially symmetrically disposed about a vertical plane passing centrally from front to rear of the shaker; a cover unit for effecting a closure of said pair of receptacles but providing a passage therebetween through which the liquid contents of the first receptacle may be transferred therefrom; and means providing an outlet leading from the vicinity of the top of the second receptacle through which essentially all contents thereof may be discharged from the shaker by a progressive forward pouring orientation of the shaker, said passage being positioned for access by minor fractional-capacity contents of the first receptacle only upon shaker orientation substantially different from said pouring orientation.

5. A beverage shaker comprising a pair of receptacles; a cover unit for effecting a closure of said pair of receptacles, said receptacles when closed having a liquid-transfer passage therebetween, and said cover unit provided with an outlet through which liquid contained in the second receptacle may be discharged from the shaker by a pouring orientation of the shaker; and means, carried in the cover unit, for shielding said outlet from substantial fractional-capacity contents of the first receptacle during said pouring orientation.

6. A beverage shaker including a base unit comprising a pair of receptacles; a substantially vertical wall common to and separating the interiors of said receptacles; a flange extending from the top of said wall partially over one of said receptacles; and a pouring guide extending from said flange and wall and directed over the other receptacle.

7. A beverage shaker comprising a pair of receptacles, a second of which is principally disposed behind the first; a cover unit for effecting a closure of said pair of receptacles, said receptacles when closed having a passage therebetween for liquid transfer; and means, comprised in said cover unit, for providing a forwardly directed outlet for liquid from the second receptacle only.

8. A beverage shaker comprising a pair of receptacles and means extending upwardly from one of said receptacles for guiding a discharge of liquid therefrom upon a progressive pouring orientation of the shaker; and a cover unit for effecting a closure of said pair of receptacles, said receptacles when closed having a passage through which liquid may be transferred therebetween upon a different orientation of the shaker, said cover unit surrounding at least a portion of said guiding means and being apertured for said discharge.

9. A beverage shaker comprising a pair of receptacles; a cover unit for effecting a closure of said pair of receptacles, said cover unit being provided with an outlet and one of said receptacles being provided with a pouring guide; and means, secured in said cover unit, for receiving liquid from said pouring guide and leading the same to said outlet.

10. A beverage shaker comprising a pair of receptacles; a cover unit for effecting a closure of receptacles, said cover unit being provided with an outlet and one of said receptacles being provided with a pouring guide; and a member, secured in said cover unit, for receiving liquid from said pouring guide and discharging the same through said outlet upon a pouring orientation of the shaker, and for returning to said one receptacle liquid received therefrom but not yet discharged upon cessation of said orientation.

11. An enclosed beverage shaker provided with an outlet for beverage discharge and with an air intake, a closure device associable with and disassociable from said outlet to close and open the same, a flexible member to which said closure device is attached, a valve controlling said air intake, and means, connected with and controlled by said flexible member, for operating said valve.

12. An enclosed beverage shaker provided with an outlet for beverage discharge, a closure device associable with and disassociable from said outlet to close and open the same, a tube extending interiorly of said shaker, a flexible member to which said closure device is attached, means for retracting said flexible member at least partially within said tube when said closure device is disassociated from said outlet, and a valve, for controlling air flow through said tube into said shaker, opened and closed in response to the retraction and withdrawal of said flexible member.

13. A beverage shaker comprising a pair of receptacles, a second of which is principally disposed behind the first; a cover unit for effecting a closure of said pair of receptacles, said receptacles when closed having a passage therebetween through which liquid may be transferred from the first receptacle by rearward shaker orientation; and forwardly directed means leading upwardly from the top front region of the second receptacle through which the contents thereof may be discharged from the shaker by forward shaker orientation.

14. A beverage shaker comprising a pair of receptacles, one of which is principally disposed behind the other; a forwardly directed pouring guide, leading upwardly from the top front region of the rear receptacle, through which the contents of that receptacle may be discharged from the shaker by forward shaker orientation; and a cover unit for effecting a closure of said pair of receptacles, said cover unit being apertured to permit the discharge through said guide, and the interior of said cover unit being spaced from said guide to leave a passage between the receptacles through which liquid contents may be transferred from the front receptacle by rearward shaker orientation.

15. A beverage shaker including means for holding ice and accommodating liquid ingredients in contact therewith for chilling of the beverage, and storing means into which the chilled beverage is transferable without residual ice, each of said two means being partially disposed on each side of a vertical plane passing centrally from front to rear of the shaker; a base in which said two means are comprised; a cover for said base for effecting a closure thereof, said two means when said base is closed having a permanent communicating passage for the transfer of the beverage therebetween; and means providing a forwardly directed outlet leading from the vicinity of the top of said storing means for pouring of the beverage therefrom and shielded during said pouring from contents of said first-mentioned means.

16. A beverage shaker comprising a pair of receptacles, a second of which is principally disposed behind the first; a single cover for effecting a closure of said pair of receptacles, said receptacles when closed having a permanent communicating passage for the transfer of liquid therebetween; means providing an outlet passage, leading around the first receptacle, for the pouring of liquid from the second receptacle upon forward shaker orientation; and means shielding said transfer passage from a substantial liquid content in the second receptacle throughout forward orientations of the shaker up to and including a substantially horizontal one.

17. A beverage shaker comprising a pair of receptacles and a partitioning element separating them, a second of said receptacles being disposed principally behind the first; a single cover for effecting a closure of said pair of receptacles, said receptacles when closed having a permanent communicating passage for the transfer of liquid therebetween; means providing an outlet passage, leading around the first receptacle, for the pouring of liquid from the second receptacle upon forward shaker orientation; and means comprised in said partitioning element for rendering said transfer passage inaccessible to a substantial liquid content in the second receptacle throughout forward orientations of the shaker up to and including a substantially horizontal one.

18. A beverage shaker comprising a pair of receptacles and a partitioning element separating them, a second of said receptacles being disposed principally behind the first; a single cover for effecting a closure of said pair of receptacles, said receptacles when closed having a permanent communicating passage, at least partially formed between said partitioning element and said cover, for the transfer of liquid between the receptacles; means providing an outlet passage, leading around the first receptacle, for the pouring of liquid from the second receptacle upon forward shaker orientation; and means comprised in said partitioning element for rendering said transfer passage inaccessible to a substantial liquid content in the second receptacle throughout forward orientations of the shaker up to and including a substantially horizontal one.

CHARLES T. JACOBS.